United States Patent [19]
Braun

[11] Patent Number: 5,142,299
[45] Date of Patent: Aug. 25, 1992

[54] HAND HELD SYSTEM FOR CLOSE-RANGE UNDERWATER PHOTOGRAPHY COMPOSING AND FOCUSING

[75] Inventor: Bradley S. Braun, Chicago, Ill.

[73] Assignee: Braun Photo-Aquatic Systems, Chicago, Ill.

[21] Appl. No.: 776,630

[22] Filed: Oct. 15, 1991

[51] Int. Cl.⁵ .............................................. G03B 17/08
[52] U.S. Cl. ...................................... 354/64; 354/165
[58] Field of Search ................................... 354/64, 165

[56] References Cited

U.S. PATENT DOCUMENTS

| | | | |
|---|---|---|---|
| 2,379,689 | 7/1945 | Fischer et al. | 95/44 |
| 4,707,094 | 11/1987 | Tusting | 354/403 X |
| 4,777,501 | 10/1988 | Caimi et al. | 354/64 |
| 4,836,671 | 6/1989 | Bautista | 356/1 |
| 4,914,460 | 4/1990 | Caimi et al. | 354/64 |

OTHER PUBLICATIONS

Church, Jim and Cathy, "*The Nikonos Handbook*", pp. 98-108 (1986).
"*Nikonos Technique*", 1987, pp. 5-31.
"*Nikonos Technique '88*", pp. 32-35.
"*Nikonos Technique '89*", pp. 21-23.
"*Nikonos Technique '90*", pp. 14-15.
"*Nikonos Technique '91*", pp. 11-34.
"Nikonos-V" product brochure.
Sea & Sea, "Take a New Look" brochure.
"ikelite usa", 1991 catalog.

*Primary Examiner*—Michael L. Gellner
*Attorney, Agent, or Firm*—Woodard, Emhardt, Naughton, Moriarty & McNett

[57] ABSTRACT

A system for composing and focusing a hand-held underwater camera system includes a first light source and a second light source which each emit a beam of visible light through the water. The two visible non-laser light beams converge at a light intersection within the field of view and the depth of field of the lens. The camera system and a photography subject, such as a fish, are moved with respect to each other until the two light beams, which converge at a beam intersection, converge on the photography subject to indicate that the photography is in focus and within the picture area. A mount holds the lights in relation to the lens, and the mount is readily removable for use on hand-held underwater cameras for close-up and macro photography within fifteen inches.

16 Claims, 5 Drawing Sheets

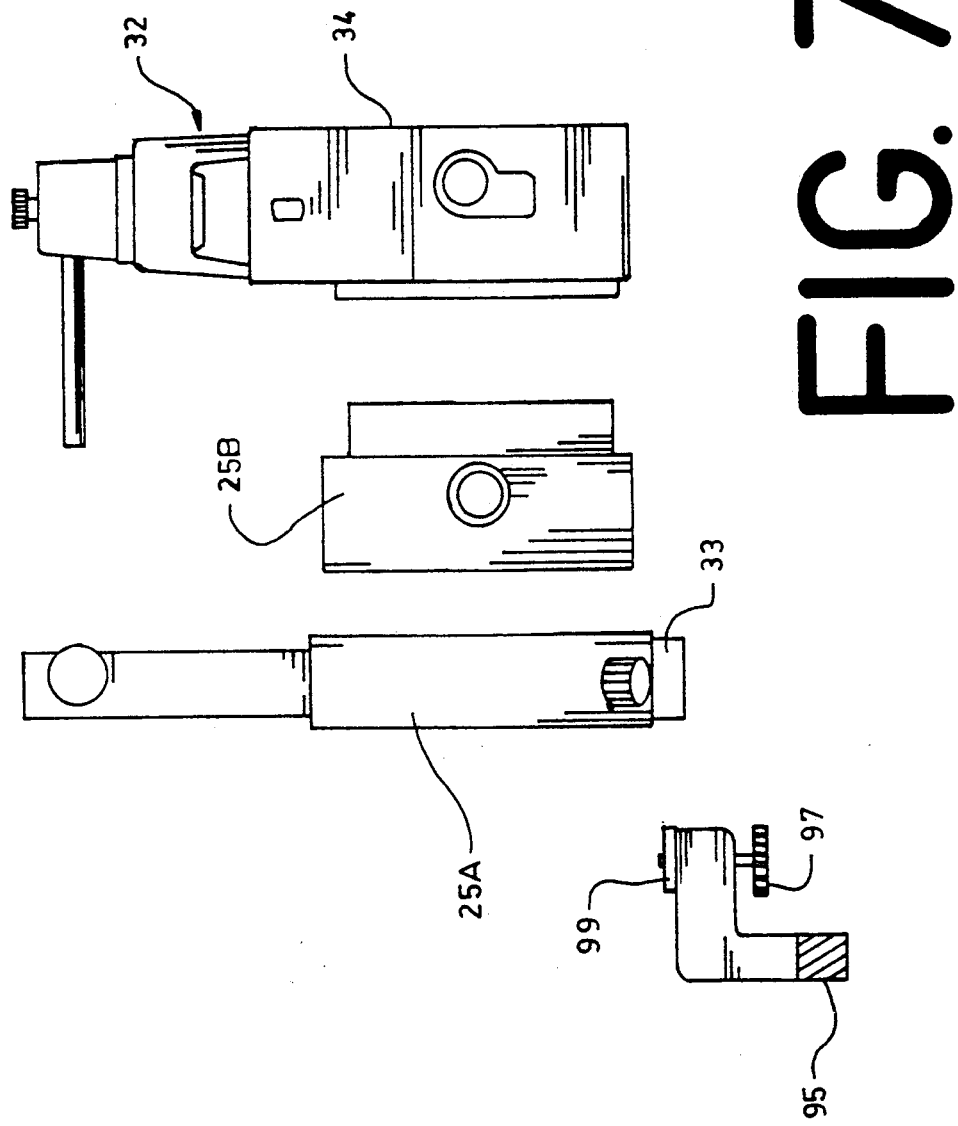

HAND HELD SYSTEM FOR CLOSE-RANGE UNDERWATER PHOTOGRAPHY COMPOSING AND FOCUSING

BACKGROUND OF THE INVENTION

The present invention relates generally to underwater photography and more specifically to a system for composing and focusing and aiming a hand-held underwater camera system for close-up and macro photography.

Underwater photography can provide excitement and challenge for scuba divers in capturing on film the myriad of life forms and other photography subjects underwater. Several underwater camera systems are commercially available including Nikonos brand systems, Sea & Sea brand systems, and other systems for still and video cameras including those using an outer housing encasing a land camera. Close-up and macro photography offer exciting opportunities for the underwater photographer since many of the fish and other subjects are better formatted using close-up and/or macro equipment.

Typically, close-up and/or macro equipment includes supplementary lens systems and/or extension tubes as are known in the art. However, such systems have a notably shallow depth of field and, due to parallax problems with the viewfinder, present difficulties for a scuba diver wearing a scuba mask in composing and focusing on underwater photography subjects. It is believed that a substantial percentage of underwater photographs which are taken are not suitably focused or composed due to these problems, resulting in the loss of a considerable number of potentially quality photographs.

The prior art approach is the use of a system utilizing either a wand and framer, a wand and goal post, or simply a wand to provide a physical reference point to define the picture area for the underwater photographer. For example, the Nikonos system uses a wand and framer. The wand is mounted to the underside of a close-up lens, projecting forwardly the focusing distance of the lens. The framer is attached to the distal end of the wand and provides a rigid frame around and defining the picture area.

These focusing and composing systems, while providing acceptable results in some circumstances, create significant problems. For example, such framers and/or wands are by design readily visible under water and, accordingly, tend to frighten sensitive tropical fish, making it extremely difficult to take their picture. Literature in the industry suggests a great deal of time and patience is required to lure such subjects into the framer, such as with bait, to be photographed. Accordingly, it would be desirable to have a system which facilitates luring the fish into the picture area without spooking the fish.

Additionally, these wand and wand and framer systems are typically rigid structures. There is a problem caused by underwater photographers jamming these rigid devices into ecologically fragile coral reefs, sponges and other life forms. This results in damage to the environment and/or bending of the rigid framers. Accordingly, it would be desirable to provide a system which does not utilize rigid structures which damage the system or the delicate undersea environment.

Some literature indicates that these shortcomings are significant enough that the wand and framer should be completely removed, and the photographer instead should rely on various estimates (such as using the photographer's arm length as a substitute wand) to avoid these problems.

The present invention overcomes these disadvantages while providing an excellent system for aiming, composing and focusing a hand-held underwater camera system at close range.

SUMMARY OF THE INVENTION

According to one embodiment, the present invention provides a focusing and composing system for underwater photography with a hand-held waterproof underwater camera system having a lens, wherein the lens has a field of view with a central point of focus located a focusing distance in front of the lens, and wherein the lens further has a depth of field in front of and behind the point of focus. The system includes a first waterproof light source mounted in a predetermined location with respect to the lens, wherein the first light source emits a substantially focused first light beam of visible light having a wavelength between 400 and 700 nanometers through the water in a predetermined direction with respect to the lens, and a second, similar waterproof light source. A common support member which is readily mounted to and readily removable from the hand-held camera system mounts the first light source and the second light source thereto in the predetermined locations with respect to the lens. The first light beam and the second light beam converge together at a beam intersection, wherein the beam intersection is located in the field of view of the lens and within the depth of field of the lens enabling composing and focusing of the camera system on a photography subject prior to taking a photograph by moving the camera system and the subject with respect to each other until the first light beam and the second light beam converge on the subject at the beam intersection. The hand-held underwater camera system has a viewfinder system without through-the-lens viewing, the viewfinder system having parallax with the camera system lens rendering the viewfinder system significantly inaccurate for composing the camera system during close-range underwater photography. The lens is for close-range photography within a focusing distance less than fifteen inches for use by an underwater diver holding the camera system in close proximity to the photography subject, wherein the beam intersection of the first light beam and the second light beam is located a distance in front of the lens ranging between four and fifteen inches.

One object of the present invention is to provide an improved system for aiming, composing and focusing an underwater camera system.

Another object of the present invention is to provide a system which is more environmentally safe, resulting in little or no damage to underwater coral reefs and the like.

Another object of the present invention is to provide a system which eliminates, or at least reduces, the propensity for spooking sensitive fish during composing and focusing.

These and other objects and advantages of the present invention will be apparent from the written description and drawings herein.

DESCRIPTION OF THE DRAWINGS

FIG. 7 is an exploded side view detail of the camera and base lens, the close-up lens, and the present invention shown partially cut away.

DESCRIPTION OF THE PREFERRED EMBODIMENT

Figure 1:
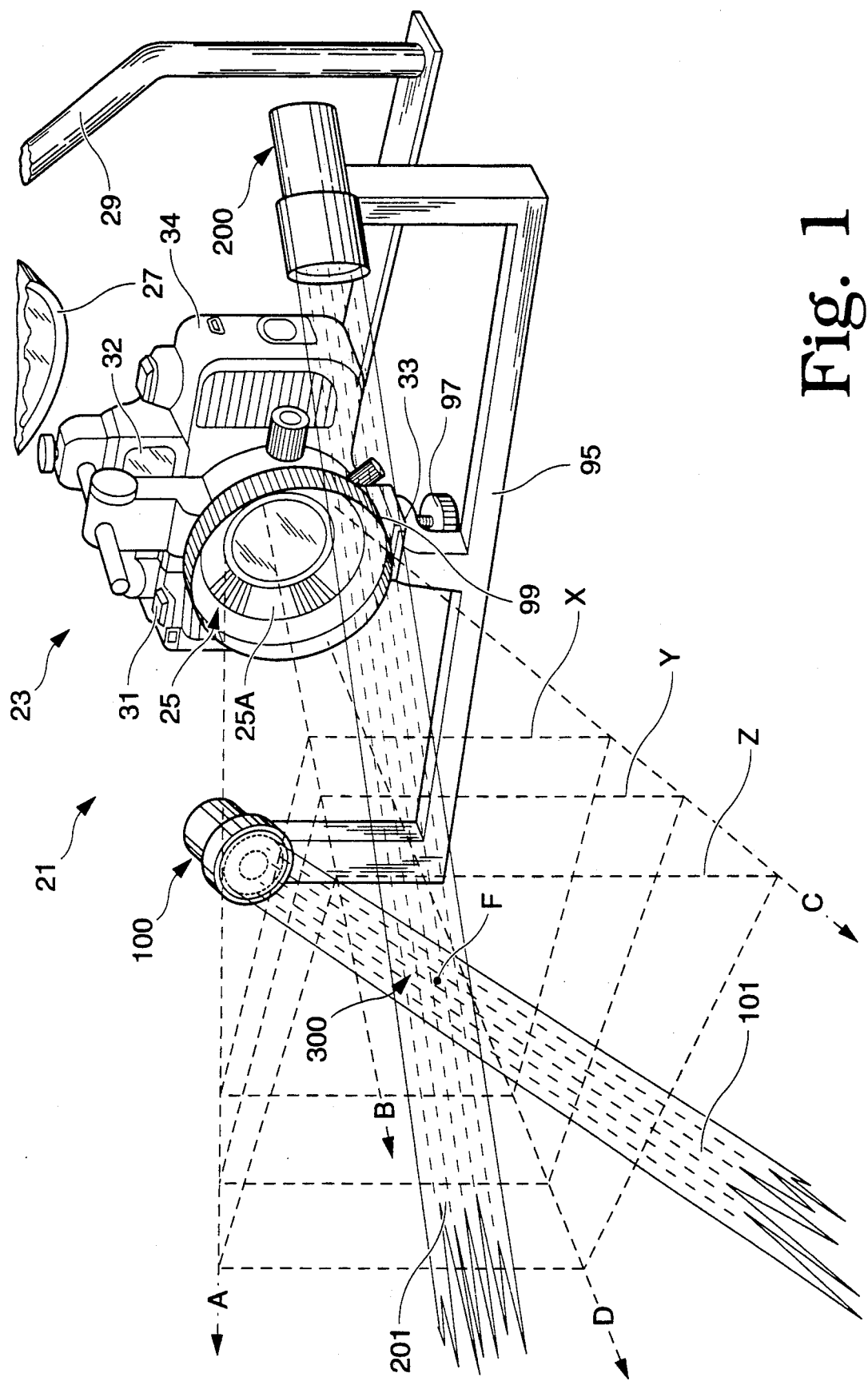
FIG. 1 is a top-front perspective view of one embodiment of the present invention mounted on an underwater camera system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
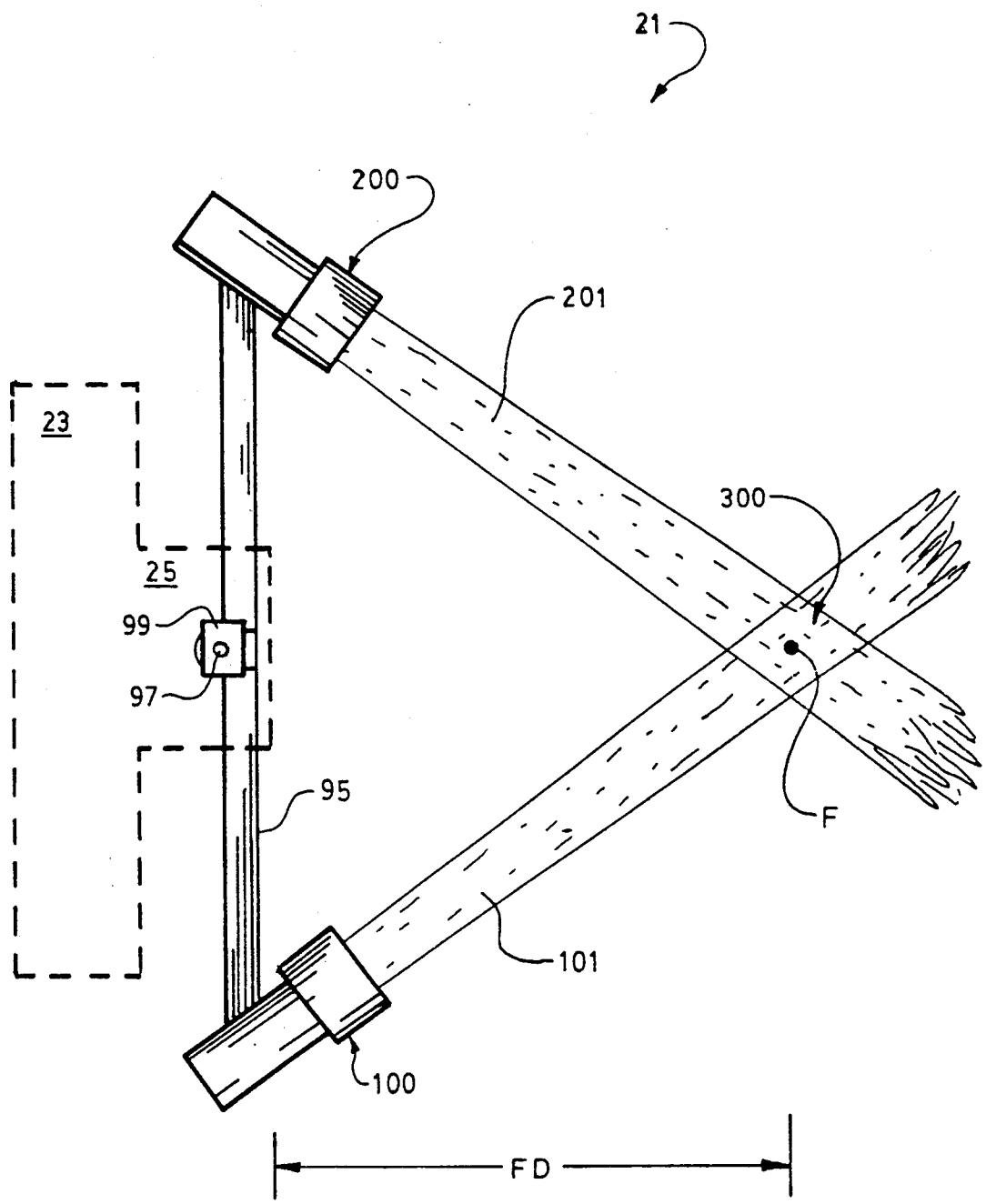
FIG. 2 is a top-plan view of the present invention shown with an underwater camera system in phantom lines.

Referring to FIGS. 1 and 2, composing and focusing system 21 is shown in connection with a hand-held underwater camera system 23. In the illustrated embodiment, camera system 23 consists of a Nikonos-V underwater camera including lens 25. As shown, lens 25 includes an exterior close-up lens attached to the 35 mm lens mounted in the camera. Camera system 23 also includes a strobe-flash unit 27 attached to the camera by bracket 29 (see FIG. 1). Note that in FIG. 1 flash 27 and bracket 29 are shown only partially and are shown cut away. Such bracket and strobe systems are well-known such as the Nikonos SB 102 or the Nikonos SB 103 systems. This overall type of camera system is well-known in the art and this type of system is further described in a book entitled "The Nikonos Hand Book" written by Jim and Cathy Church, ISBN #0-9616093-0-3, which is hereby incorporated by reference. Of course it is to be understood that camera system 23 is merely illustrative, the present invention also being utilizable with other underwater camera systems including systems made by Sea & Sea, such as for example the Motormarine I and the Motormarine II.

Camera system 23 includes shutter release 31 which is pressed to expose film within the camera system to produce a photographic image. Viewfinder 32 is separate from the camera system's lens and does not provide through-the-lens viewing. Also, while viewfinder 32 is useful for general photography with standard lenses, when close-range photography subjects are in focus close to the lens, there is significant parallax between the viewfinder and the lens, rendering the viewfinder inaccurate for aiming and for composing the camera system. Moreover, in some systems such as the illustrated Nikonos-V brand system the close-up lens mounting obstructs viewfinder 32. Lens 25 in the Nikonos-V system as illustrated includes a base lens 25B and close-up lens 25A mounted on the outside of the base lens. Lens 25 and more specifically close-up lens 25A includes a shoe receiver 33 secured to the bottom-side of lens 25, and more particularly on the bottom-side of the close-up lens attachment portion of lens 25. The shoe receiver provides a female receptor to receive a male shoe slid from front to rear for mounting therein. The present invention may be permanently mounted to close-up lens 25A which in turn is removably mounted to the remainder of the camera system.

FIG. 7 illustrates and exploded view of camera system 23 with camera body 34, lens 25 including close-up lens 25A and base lens 25B, shoe receiver 33, shoe 99, set-screw 97, and support member 95. Alternatively the invention may be mounted to an extension tube accessory mounted between the base lens and the camera body. Close-up lens 25A may be omitted and an extension tube inserted between camera body 34 and base lens 25B with a shoe 33 on the bottom side of the extension tube for macro photography and with the focusing distance varied accordingly.

Lens 25 has a field of view illustrated by the phantom line vectors A, B, C and D (see FIG. 1). The volume within these vectors constitutes the field of view which defines the picture area to be taken by the camera system. Under optimal focusing conditions, plane Y defines the picture area. Plane Y is located a focusing distance "FD" (see FIG. 2) in front of lens 25 which, with this particular system, is 9.25 inches. Note that point of focus F is located in the exact center of the picture area plane Y, lying along the central axis defined by lens 25 in front of the lens.

Plane Y lies in between plane X and plane Z within the field of view of the lens. Planes X and Z define the outer limits of the depth of field of lens 25 both in front of and behind picture area plane Y and point of focus F. As is known generally in photography, the depth of field will vary depending on various factors such as the f-stop of the lens, the focal length of the lens and the focusing distance of the lens. Note further that in a strict sense planes X, Y and Z are believed to more precisely constitute spherical or quasi-spherical surfaces, but are referred to as planes herein for simplicity of illustration. Accordingly, the field of view defined by vectors A, B, C and D and the depth of field defined by planes X and Z defines a three-dimensional volume of water within which the camera system 23 will take a picture of a photography subject in focus (the "focus volume").

The present invention provides a first light source 100 and a second light source 200 which are mounted in a predetermined location with respect to lens 25. First light source 100 emits a substantially focused beam of visible light 101 into the volume defined by the field of view and the depth of field of the lens, and preferably directed at the point of focus F. Similarly, light source 200 emits a substantially focused beam of visible light 201 into the volume defined by the field of view and the depth of field of lens 25 and to intersect light beam 101 at beam intersection 300. Preferably, beam intersection 300 coincides with point of focus F. However, beam intersection 300 may fall within other locations within the field of view and the depth of field of the lens to utilize the present invention, and may even fall within the fringes of the focus volume. Beam intersection 300 provides a reference point in free space from which the photographer may compose and focus the camera without having to look through viewfinder 32.

Light sources 100 and 200 may be of a variety of designs to actively emit a beam of light visible to the human eye with wavelengths ranging between 400 and 700 nanometers. In the illustrated embodiment, the light sources comprise independent underwater flashlights, preferably compact and less than six inches in length, having a substantially focused beam and containing their own batteries, light bulb and switching circuitry. One example of a suitable flashlight is the Q-40 model offered by Underwater Kinetics of San Marcos, Calif., U.S.A. Other light sources may be used including ones with a common battery pack and switching circuitry, fiber-optics including focusing lenses for focusing the light beam, and the like. Light beams 101 and 201 are substantially focused. Although there is some latitude in the degree of focus, a spot caused by the beams on the photography subject ideally is not greater than about two or three inches across, although this may vary so long as the beam is sufficiently focused to allow identifiable convergence on the photography subject for composing and focusing. Preferably, the beams are not laser beams, but instead beams having multiple wavelength, multiple color light such as white light. In this way, when the beams remain on during exposure of the photograph, there is more even coloration if any residual light from the beams, over and above the illumination by the strobe flash, appears in the photograph. Also in this regard, the intensity of light beams 100 and 200 is relatively low enough that they would not provide sufficient illumination for proper exposure without the significant added light from strobe flash 27.

Figure 6:
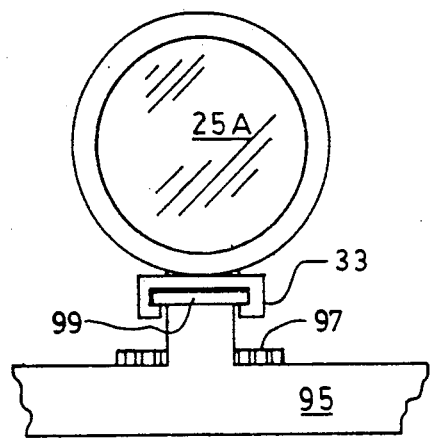
FIG. 6 is a frontal detail of one embodiment of the mounting between the close-up lens and the present invention.
Figure 8:
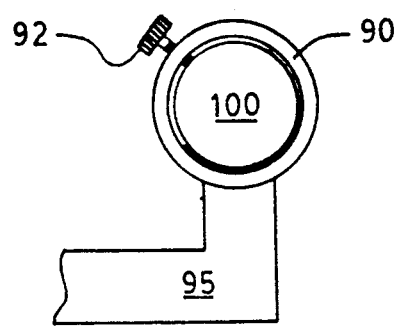
FIG. 8 is a rear detail of one embodiment of a mounting for the light sources of the present invention.

Light sources 100 and 200 are waterproof and are each located in a predetermined position with respect to lens 25. In the preferred embodiment this is accomplished by having the light sources mounted in common support member 95. FIG. 8 shows a detail of one example of such mounting. Light source 100 is mounted in yoke 90 of support member 95. Such yoke may completely or partially surround light source 100, and mounting may include the use of a set screw 92 as illustrated, friction fit, rubber straps, or any other form of attachment. Support member 95 may have a multitude of configurations, the important feature being that it holds the light sources fixed during photography in a predetermined location with respect to the lens and orients the light sources so the light beams 101 and 201 each point in a predetermined direction with respect to lens 25 to provide convergence at beam intersection 300. The housing or mount 95 may be constructed of a variety of materials, such as, for example, aluminum or other metal, or plastic, such as acrylic,—transparent or otherwise. In the illustrated embodiment the light sources are mounted to support member 95 which in turn is mounted to lens 25. Such mounting to the lens is accomplished by shoe receiver 33 on the bottom side of the lens for receiving shoe 99 (See FIG. 6). Set screw at 97 is rotatable about a vertical axis to hold shoe 99 and shoe receiver 33 in snug relationship to one another. Such shoe and shoe receiver configuration may be identical to the shoe/shoe receiver/set screw configuration used by the Nikonos system for mounting a wand and framer with respect to the lens. The shoe receiver generally has a frontal cross-section of a downwardly pointed "C" to provide a female receptacle for the male shoe 99 to slide therein. Of course, other mounting systems may be utilized. For example, mounting may be accomplished directly to the camera, such as into a threaded hole on the bottom side of the camera adapted for flash bracket 29, or mounting to a shoe on the topside of the camera. The mounting system may be integrated into the strobe-flash bracket. Other camera systems may be adapted as well to provide for mounting of the light sources with respect to the lens.

FIG. 2 illustrates a top-plan view of the present invention illustrating angular relationships between lens 25, light sources 100 and 200, and point of focus F. Note that in FIG. 2 the strobe flash is not shown for drawing clarity. The configuration may be treated as right triangles with three sides generally referred to as the lens axis side (lens to point of focus), the support offset side (lens to light source), and the light beam side (hypotenuse, light source to point of focus). With such configuration, the inwardly directed angle between the support offset side and the light beam side of the triangle is determined by calculating that the sine of the angle equals the length of the lens axis side divided by the length of the light beam side. The system is hand-held and preferably compact with light sources spaced apart not more than about twenty-four inches.

Figure 3:
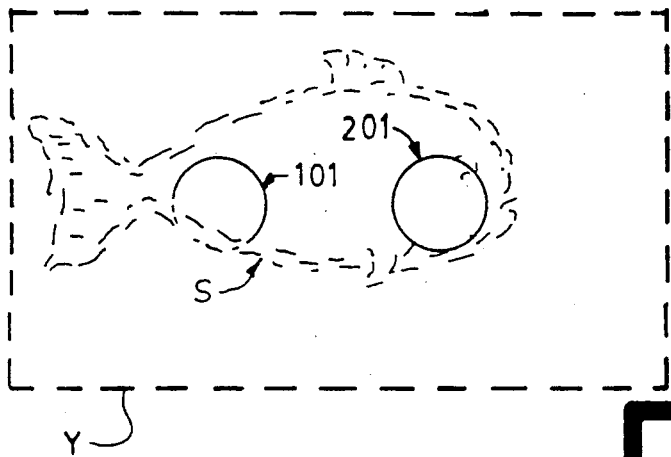
FIG. 3 is a view of the first light beam and second light beam of the present invention on a photography subject which is at a focusing distance which is too great and is out of focus.
Figure 4:
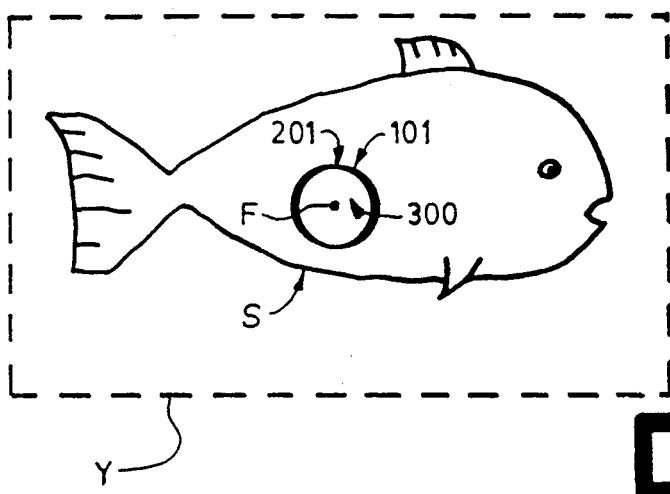
FIG. 4 is a view of the first light beam and second light beam of the present invention converged on a photography subject which is at a focusing distance which is proper and is in focus.
Figure 5:
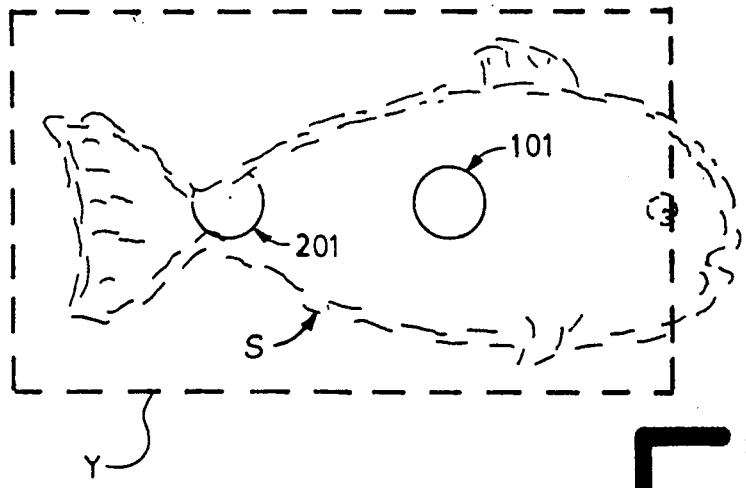
FIG. 5 is a view of the first light beam and second light beam of the present invention on a photography subject which is at a focusing distance which is too small and is out of focus.

Referring to FIGS. 3-5, a series of views is shown from the prospective of lens 25 showing the field of view defined by plane Y. FIGS. 3 and 5 show the photography subject S, a tropical fish, out of focus. FIG. 4 shows subject S in focus. FIG. 3 illustrates subject S too far away from the lens, or in other words beyond the outer depth of field as defined by plane Z illustrated in FIG. 1. Accordingly, in the illustrated embodiment light beams 201 and 101 are separated, with light beam 201 being to the right of light beam 101. Conversely, FIG. 5 shows photography subject S too close to the lens, or in other words, proximal to the depth of field as defined by plane X illustrated in FIG. 1. Likewise, light beams 201 and 101 are separate, with light beam 201 being to the left of light beam 101. Note that several techniques are available with the present invention to allow the photographer to determine readily whether a non-converging light beam is too close or too far. One technique is to have the light beams be slightly divergent beams, resulting in the light beams appearing larger in FIG. 3 than they do in FIG. 5. The photographer may also move the hand-held system with respect to the photography subject and observe whether the light beam dots on the subject move together or apart, and thereby increase or decrease the distance until the subject is both in focus and aimed and composed without using the viewfinder.

FIG. 4 shows light beam 101 and light beam 102 converging on subject S, indicating that the subject is within the focus volume, and preferably is at point of focus F. Although preferably light beam convergence consists of exact beam convergence, it is possible to embrace the spirit of the present invention overall even if the light beams are oriented in near proximity to one another, such as directly vertically above one another. Furthermore, it is to be understood that the mounting positions of the light sources do not have to be symmetric with one another so long as they intersect as described. Additionally, the light sources may be placed above and/or below the lens, although in the preferred embodiment they are located in a horizontal plane with lens 25 for geometric simplicity. Also, more than one light source may be utilized, such as for triangulation.

The present invention provides an additional advantage beyond reducing the propensity to spook fish and beyond being ecologically safer. In particular, the present invention provides the photographer with greater creative control. In conventional framer systems, it is generally understood that the strobe flash unit must be placed more or less directly above the lens and in axial alignment with the picture area, otherwise the framer will cast a shadow on the photography subject. With the present invention which has the field of view and focus volume free of wands and framers, there is no physical object to cast shadows on the photography subject. Accordingly, the photographer has greater latitude in selecting a flash angle to provide desired lighting effects. Note also that light sources 101 and 102 are sufficiently bright to allow focusing and composing, but are considerably dimmer than the light produced by the strobe-flash unit. Typically, the difference is at least a factor of ten. In this way, the light spots caused by the present invention are washed out by the strobe flash so that the photograph does not show a light spot where light beams 101 and 201 were present on the subject. The light sources may also provide illumination generally and for composing during night dives, reducing the need for additional lights carried by the diver.

The present invention is especially well suited for close-up photography as well as for macro photography. Such photography can include magnification with a film size to picture area size (image size) ratio of 1:11 or less and with a focusing distance FD of between about four inches and fifteen inches.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A focusing and composing system for underwater photography with a hand-held waterproof underwater camera system having a lens, wherein the lens has a field of view with a central point of focus located a focusing distance in front of the lens, and wherein the lens further has a depth of field in front of and behind the point of focus, comprising:

a first waterproof light source mounted in a predetermined location with respect to the lens, wherein said first light source emits a substantially focused first light beam of visible light having a wavelength between 400 and 700 nanometers through the water in a predetermined direction with respect to the lens, wherein said first light beam comprises non-laser light consisting of multiple wavelength visible light;

a second waterproof light source mounted in a predetermined location with respect to the lens and apart from said first light source, wherein said second light source emits a substantially focused second light beam of visible light having a wavelength between 400 and 700 nanometers through the water in a predetermined direction with respect to the lens, wherein said second light beam comprises non-laser light consisting of multiple wavelength visible light;

a common support member which is readily mounted to and readily removable from the hand-held camera system, wherein said common support member mounts said first light source and said second light source thereto in said predetermined locations with respect to the lens;

wherein said first light beam and said second light beam converge together at a beam intersection, wherein said beam intersection is located in the field of view of the lens and within the depth of field of the lens enabling composing and focusing of the camera system on a photography subject prior to taking a photograph by moving the camera system and the subject with respect to each other until said first light beam and said second light beam converge on the subject at said beam intersection; and wherein said hand-held underwater camera system has a viewfinder system without through-the-lens viewing, said viewfinder system having parallax with the camera system lens rendering the viewfinder system significantly inaccurate for composing the camera system during close-range underwater photography;

wherein said hand-held camera system lens is for close-range photography within a focusing distance less than about fifteen inches for use by an underwater diver holding the camera system in close proximity to the photography subject, and wherein said beam intersection of said first light beam and said second light beam is located a distance in front of the lens ranging between about four and fifteen inches, and wherein said lens provides a ratio of film size to image size of less than 1:11 for close-up and macro photography.

2. The system of claim 1 and further comprising a strobe-flash for providing illumination of the photography subject significantly in excess of illumination caused by said first light beam and said second light beam.

3. The system of claim 2 wherein an area surrounding the field of view of the lens is free from any framing wire and from any focusing wand.

4. The system of claim 3 wherein said camera system lens inlcudes a close-range photography attachment selected from the group consisting of: a close-up lens, and an extension tube.

5. The system of claim 4 wherein said common support member includes a mounting shoe for mounting in a shoe receiver on a bottom side of the lens.

6. The system of claim 5 wherein said beam intersection coincides with the point of focus of the lens, and wherein said readily removable support member comprises a generally horizontal cross bar having a left end and a right end, wherein said first light source is mounted atop said right end and said second light source is mounted atop said left end, and wherein said shoe mount is positioned between said right and left ends atop said cross bar and beneath the lens and is removed from said shoe receiver by sliding said shoe mount forewardly out of said shoe receiver.

7. The system of claim 6 wherein said beam intersection coincides with the point of focus of the lens about 9.25 inches in front of the lens, and wherein said camera system lens includes a close-range photography attachment comprising a removable close-up lens, and wherein said common support member includes said mounting shoe for mounting in said shoe received on a bottom side of the close-up lens.

8. The system of claim 7 wherein said first light source and second light source are spaced apart a distance not greater than about twenty-four inches.

9. The system of claim 1 wherein said first light source and second light source are spaced apart a distance not greater than about twenty-four inches.

10. The system of claim 1 wherein an area surrounding the field of view of the lens is free from any framing wire and from any focusing wand.

11. The system of claim 1 wherein said camera system lens includes a close-range photography attachment selected from the group consisting of: a close-up lens, and an extension tube.

12. The system of claim 1 wherein said common support member includes a mounting shoe for mounting in a shoe receiver on a bottom side of the lens.

13. The system of claim 1 wherein said beam intersection coincides with the point of focus of the lens.

14. The system of claim 1 wherein said camera system lens includes a close-range photography attachment comprising a removable close-up lens, and wherein said common support member includes a mounting shoe for mounting in a shoe receiver on a bottom side of the close-up lens.

15. The system of claim 14 wherein an area surrounding the field of view of the lens is free from any framing wire and from any focusing wand.

16. The system of claim 1 wherein said beam intersection coincides with the point of focus of the lens about 9.25 inches in front of the lens.

* * * * *

UNITED STATES PATENT AND TRADEMARK OFFICE
CERTIFICATE OF CORRECTION

PATENT NO. : 5,142,299

DATED : August 25, 1992

INVENTOR(S) : Bradley S. Braun

It is certified that error appears in the above-identified patent and that said Letters Patent is hereby corrected as shown below:

In Column 8, Line 48, "inlcudes" should read --includes--.

In Column 8, Line 63, "removed" should read --removable--.

In Column 8, Line 64, "forewardly" should read --forwardly--.

Signed and Sealed this

Twenty-eighth Day of September, 1993

Attest:

BRUCE LEHMAN

Attesting Officer      Commissioner of Patents and Trademarks